United States Patent [19]

McIntire et al.

[11] 4,099,634

[45] Jul. 11, 1978

[54] COMBINED MOTOR PULLER AND STAND

[76] Inventors: Robert Lee McIntire; Timothy Lee McIntire, both of 3325 May St., Sacramento, Calif. 95838

[21] Appl. No.: 756,379

[22] Filed: Jan. 3, 1977

[51] Int. Cl.$^2$ .................................................. B65G 65/04

[52] U.S. Cl. ...................................... 214/86 R; 212/63; 254/133 R

[58] Field of Search ......................... 212/56, 63; 269/17; 254/133, 134; 214/86 R, 1 D, 130 R

[56] References Cited

U.S. PATENT DOCUMENTS

| | | | |
|---|---|---|---|
| 1,331,938 | 2/1920 | McConnell et al. | 269/17 |
| 1,614,697 | 1/1927 | Snook | 269/17 |
| 2,654,147 | 10/1953 | Wilson et al. | 269/17 |
| 2,998,149 | 8/1961 | Bopp | 212/63 |
| 3,059,785 | 10/1962 | Buckeye | 254/133 R |
| 3,084,808 | 4/1963 | Peduzzi et al. | 212/63 |
| 3,367,512 | 2/1968 | Kaplan | 214/130 R |

*Primary Examiner*—Lawrence J. Oresky

*Attorney, Agent, or Firm*—Blair & Brown

[57] ABSTRACT

A combined motor puller and stand having a forked leg base, on rollers. A vertical column is hydraulically adjustable in height and the top of this column has a horizontal arm, with a roller carriage within the arm. Midway along the vertical column there is a moveable, adjustable fixture for attachment to the transmission plate of some motor, for further security to a motor that is suspended by the puller.

1 Claim, 6 Drawing Figures

COMBINED MOTOR PULLER AND STAND

BACKGROUND OF THE INVENTION

Whenever it is necessary to remove a heavy engine from the body of an automobile, and also to replace that engine if needed, a secure, flexible operating means for handling that motor is in great demand. This motor handling means must have great weight raising facility and at the same time being maneuverable to move the motor in safety.

FIELD OF THE INVENTION

The present invention relates to a combined motor puller and stand for handling automobile engines.

SUMMARY OF THE INVENTION

The present invention of a combined motor puller and stand has the general format of a forked-leg base on rollers for movement around, and a vertical column from the base to support the motor. A hydrauically operated plunger extends the height of the column to thus raise the motor from a car chassis, and also there is a horizontal arm on the end of the column with a roller carriage inside the arm. Moveable along the vertical column there is a plural bolt attachment to the transmission end of the motor for additional security and maneuverability.

The primary object of the invention is to provide a combined motor puller and stand adapted for easier handling of an automobile engine, and removal or replacement of such an engine in the frame of a car.

Other objects and advantages will become apparent in the following specification when considered in light of the attached drawings.

DESCRIPTION OF THE PREFERRED EMBODIMENT

Figure 1:
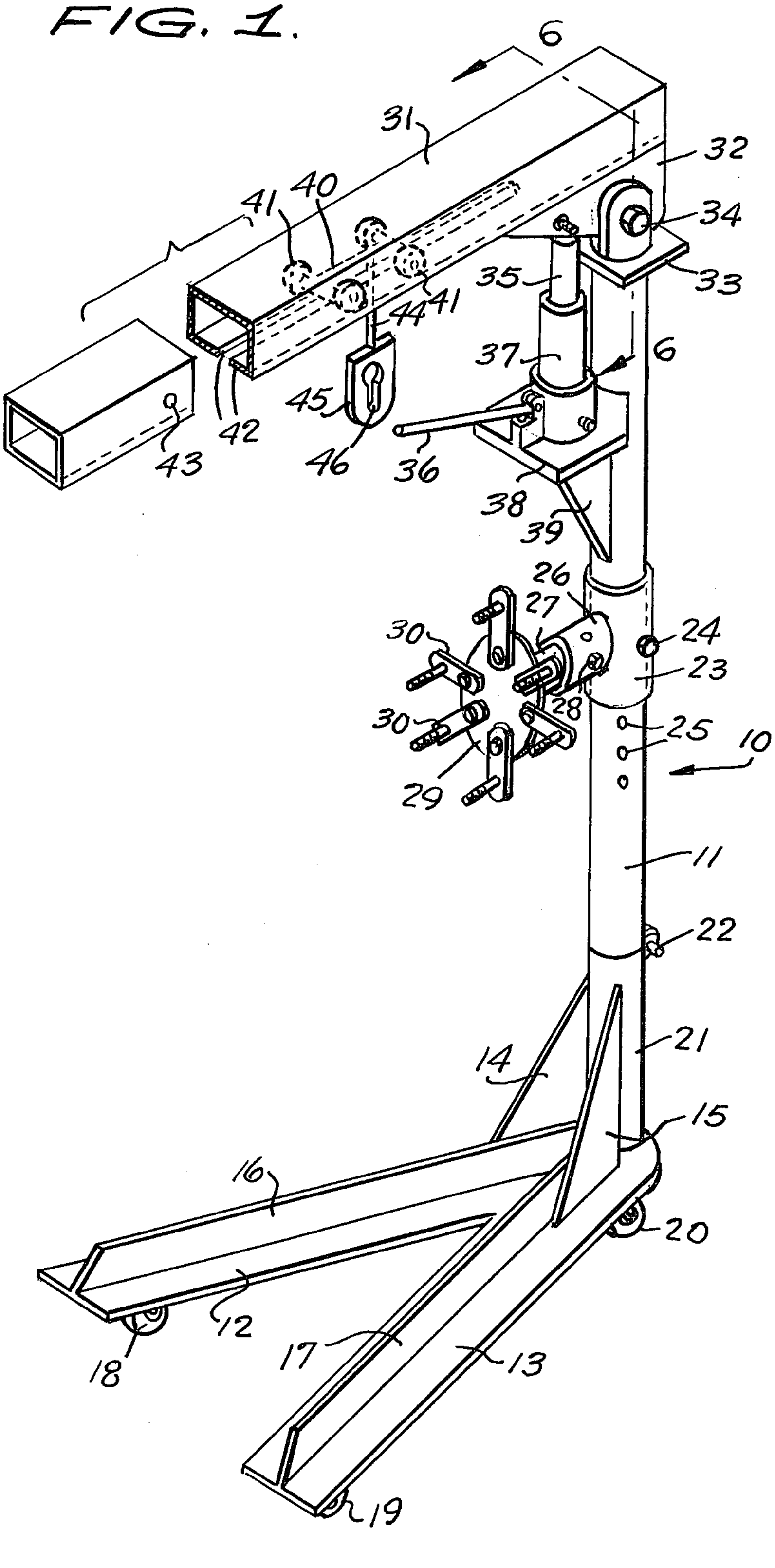
FIG. 1 is a full length perspective view of the invention without the attachment of a motor.
Figure 6:
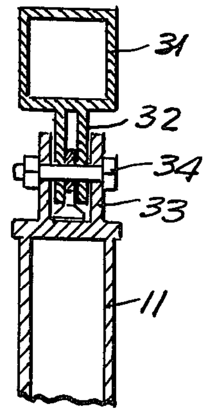
FIG. 6 shows a sectional view taken along the line 6—6 of FIG. 1 looking in the direction of the arrows.
Figure 4:
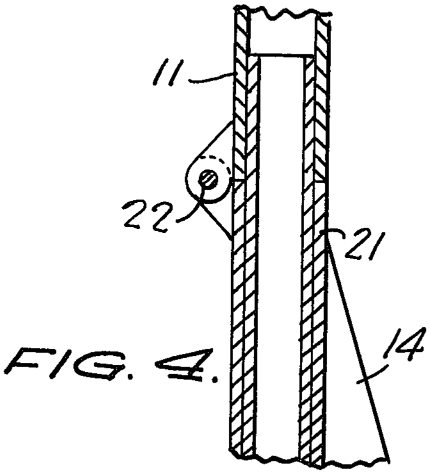
FIG. 4 shows a sectional view taken along the line 4—4 of FIG. 2 looking in the direction of the arrows.
Figure 5:
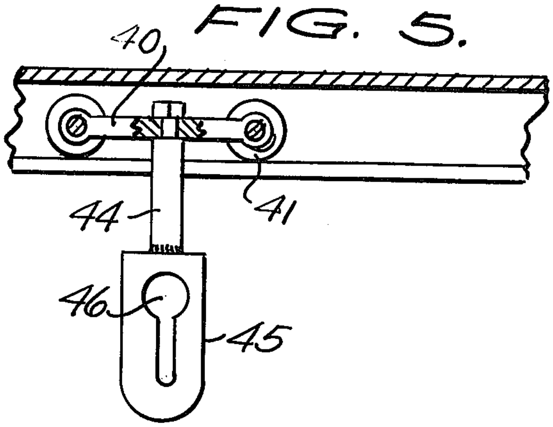
FIG. 5 shows a sectional view taken along the line 5—5 of FIG. 2 looking in the direction of the arrows.
Figure 2:
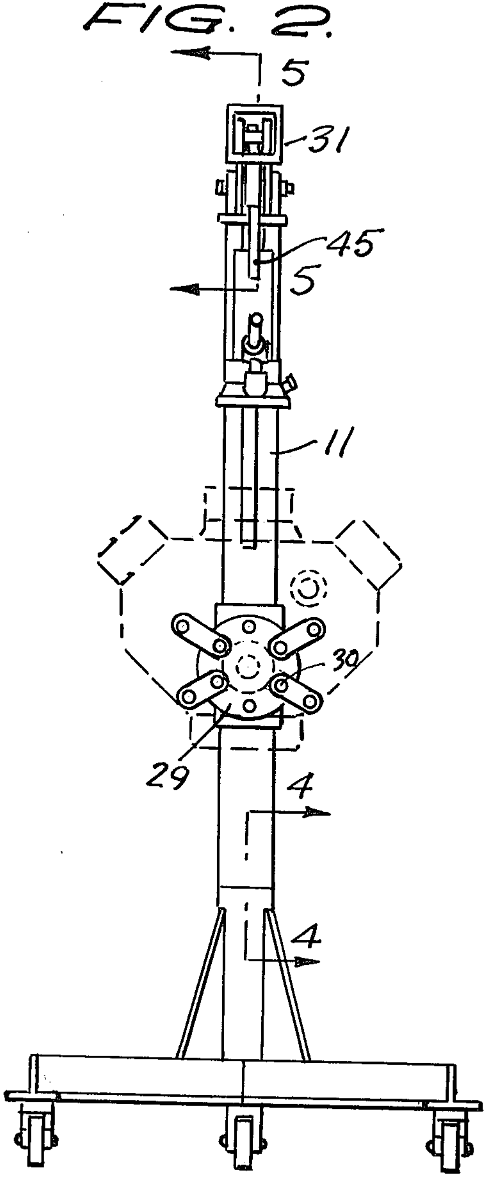
FIG. 2 is a rear elevation of the invention with a motor in place.

Referring now to the drawings in detail, wherein like reference characters indicate like parts throughout the several figures, the reference numeral 10 indicates generally a combined motor puller and stand forming the invention, and having a vertical column 11 and a pair of forked feet, or carriage, 12 and 13.

The forked feet 12 and 13 are joined together in a V-shaped carriage with column 11 mounted at the junction of the legs. Triangular braces 14 and 15 connect feet 12 and 13 to column mounting 21 and give the column 11 strength so that it will not break free from these feet. Also along the distance of the feet 12 and 13 there are braces 16 and 17 to prevent the legs from bending due to the weight of a motor, as will be understood hereinafter. Rollers 18, 19 and 20 provide maneuverability to the stand.

As mentioned above, column mounting 21 is integral with feet 12 and 13, as well as braces 14, 15, 16 and 17 and there is a withdrawal pin 22 and associated loops for separation of column 11 and mounting 21 should the need arise.

About midway up the length of column 11 there is a slidable sleeve 23 whose position and height can be locked in place be means of a pin 24 and mating holes 25 drilled through the column 11.

Slidable sleeve 23 is in effect a T connection and therefore has a horizontal arm 26 that serves a rod 27 inserted into arm 26 and the rod 27 being rotatable within arm 26 but locked in place by spring pin 28 and its associated holes.

On the outer end of rod 27 there is attached a circular plate 29 for ultimate attachment to a motor being moved. Circular plate 29 is in a vertical plane and has a plurality of pivoted arms and bolts 30 that may be adjusted for attachment to the transmission plate of a motor, the number and angle of the bolts being selected according to the particular requirement.

Pivoted at the upper end of column 11 there is a horizontal arm 31, which in effect is a hollow rectangle. The inner end of arm 31 has a triangular supporting plate 32 along its bottom portion that is threaded through a U-shaped cap 33 on column 11, while a transverse bolt 34 goes through plate 32 and cap 33 to provide arm 31 with a pivot means.

Figure 3:
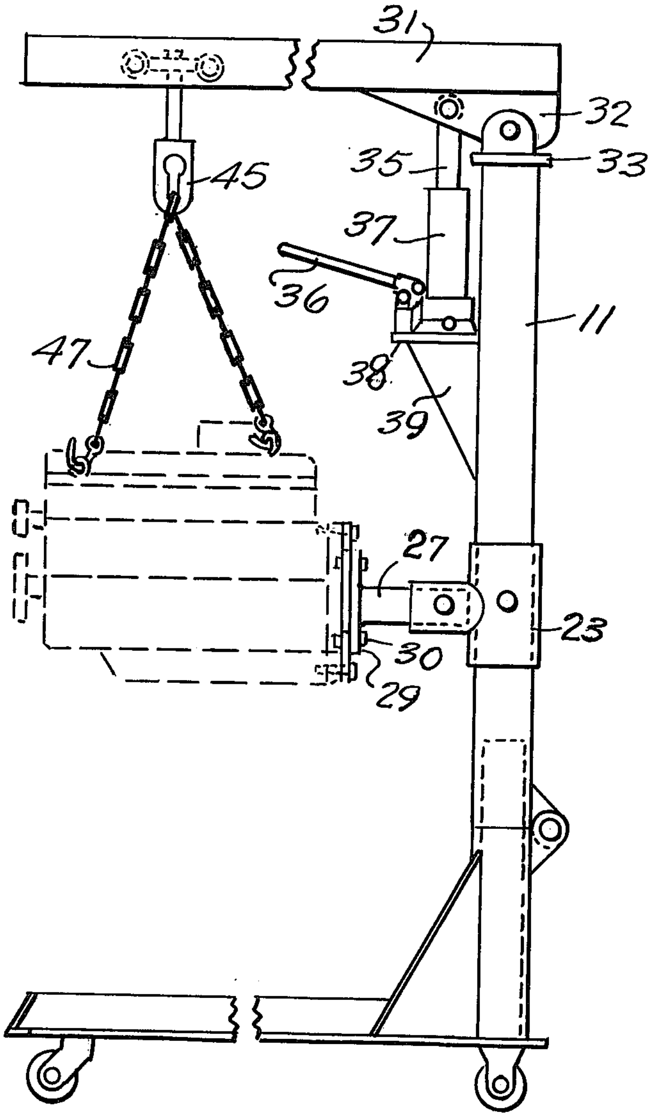
FIG. 3 shows a side elevation of the invention with a motor suspended on the stand.

Near the forward end of plate 32 there is connected the end of a hydraulic piston 35, this piston being made to move upward through operation of a hydraulic lever 36 to increase the hydraulic pressure in container 37. In FIGS. 1 and 3 there is clearly shown that the hydraulic means 37 rests on a shelf 38 supported by plate 39 attached to column 11.

Within the rectangular, hollow, horizontal arm 31 there is a wheeled carriage 40 that travels along the arm 31 on wheels 41 and guided by ridges 42 in the base side of the arm. Not fully shown, there is a pin 43 transversely across the arm 31 to serve as an ultimate limit for the movement of carriage 40.

To support a motor, when it is attached to the carriage 40, there is a rod 44 having a large, bulbous end attached to the frame of carriage 40, the rod hanging vertically and terminating in a plate 45. It can be clearly seen that plate 45 is perforated with a key-hole type puncture 46, this shape being commonplace knowledge of means for attaching easily a chain link. Reference to FIG. 3 shows a chain 47 hooked into plate 45, furnishing a means for supporting a motor.

In the use and operation of the invention, legs 12 and 13 are pushed near a car, or other rack, on which a motor is placed, and a chain 47 is attached to the motor and links inserted in plate 45. Before this, if necessary, arm 31 has been angled over the motor and carriage 40 has been rolled along the arm so that it is over the motor and within easy reach of the chain. After attachment to the motor, lever 36 is worked a few times to increase the hydraulic pressure in means 37, extend plunger 35, and thereby angle up the horizontal arm 31 and motor. Once the motor is freely suspended carriage 40 is moved toward column 11 until plate 29, with its arms and bolts 30, are in contact with, and attachable to the end of the motor. This adds further security to the motor puller so that the entire stand and its motor may be rolled on wheels 18, 19 and 20 to other locations with a minimum of danger.

Having thus described the preferred embodiment of the invention it should be understood that numerous structural modifications and adaptations may be resorted to without departing from the spirit of the invention.

What is claim is:

1. A combined motor puller and stand comprising a pair of forked feet joined together to form a substantially V-shaped carriage, brace members disposed on said feet to strengthen said feet, rollers disposed on the bottom extremities of said feet, an upstanding vertical column emanating from said feet at their joining area, a column mount disposed on said feet underlying said column and connected thereto by braces pinned together by means of a removable pin, first and second substantially triangular shaped brace members disposed at the joining area of said column and said feet to further fortify the joining area, a hollow substantially rectangular first arm, having a slot horizontally extending on a downward face, pivotally connected to said column at an extremity of said column remote from said feet through a third supporting triangular plate, a shelf supported on said column by a fourth triangular plate below said first arm, a jack member extending between said shelf and said first arm and connected thereto at said third triangular plate which serves to rotate said first arm, a sleeve element slideably disposed on said column between said first and second triangular braces and said fourth triangular plate, a locking pin which extends through said sleeve and column to constrain said sleeve from sliding, a second arm extending horizontally from said column at said sleeve on a side of said column coincident with said first arm, a vertical plate connected to said second arm at an extremity remote from said sleeve, plural arms having bolt means extending outwardly therefrom for bolting an engine element thereto and pivoted to said vertical plate extending outwardly therefrom pivotally adjustable to conform to bolt patterns on an engine element, a wheeled carriage freely riding within said first arm connected to a depending rod which passes through said slot in said first arm, and a chain depending from said rod through a plate connected to said rod so as to support an engine element, a fixed distance below said first arm, whereby when said engine element has been removed from a vehicle with said chain and said jack, the engine element can be fastened to said vertical plate for subsequent work.

* * * * *